Figure 1:
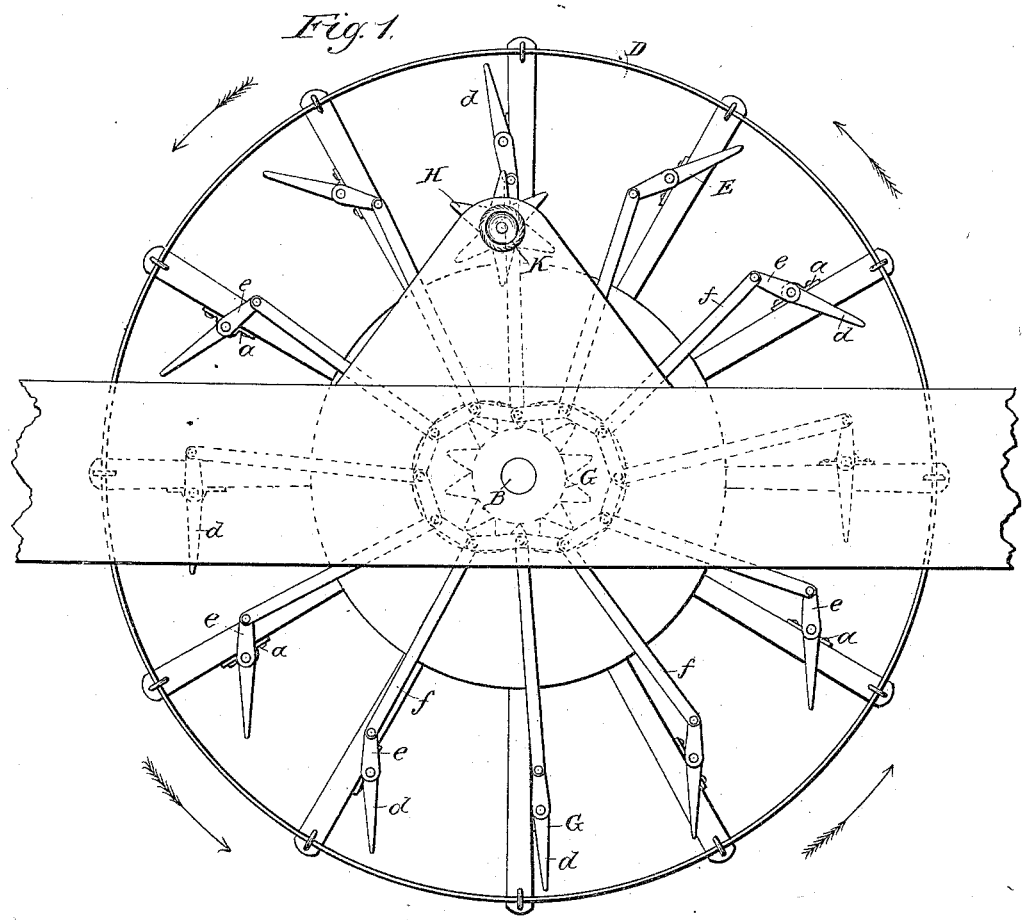

(No Model.) 4 Sheets—Sheet 1.

T. P. TURNBULL.
FEATHERING PADDLE WHEEL.

No. 335,726. Patented Feb. 9, 1886.

Witnesses.
Will R. Onohundro.
Howard Hallock.

Inventor.
Thomas P. Turnbull
By, Jno. G. Elliott
Atty.

(No Model.)
4 Sheets—Sheet 2.
T. P. TURNBULL.
FEATHERING PADDLE WHEEL.
No. 335,726. Patented Feb. 9, 1886.
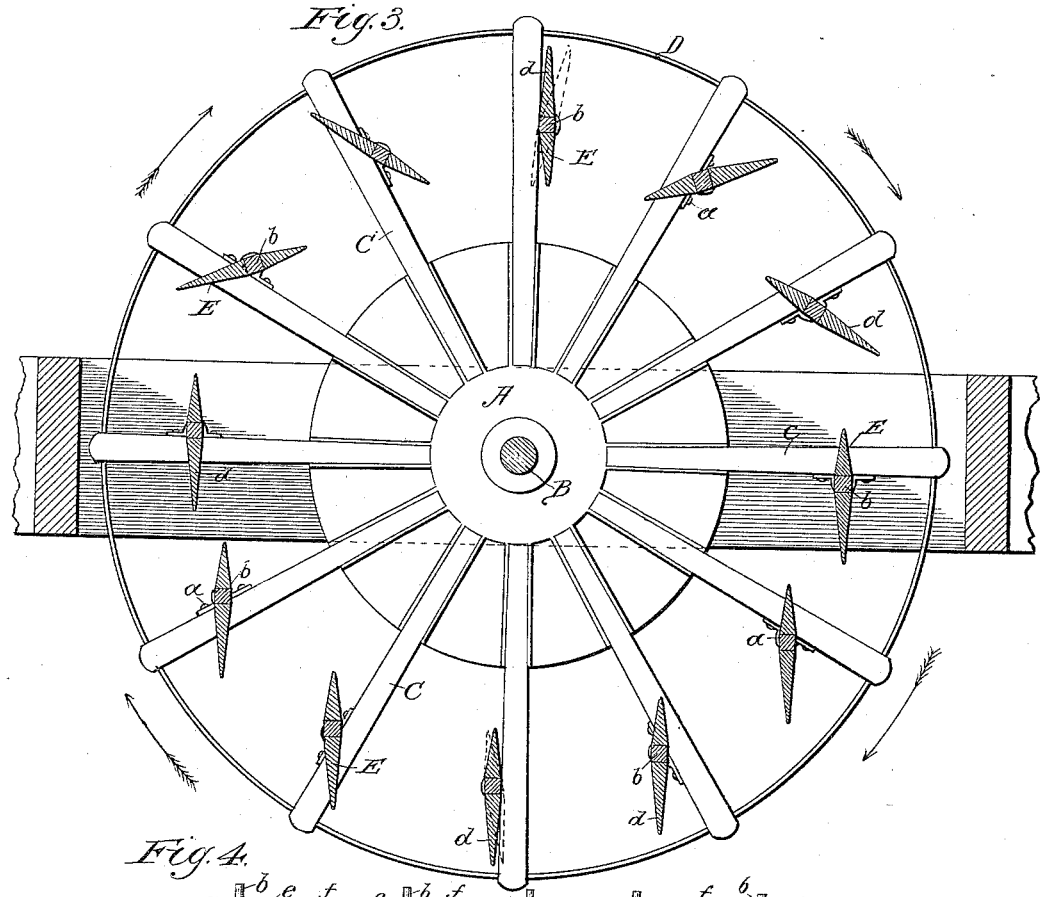
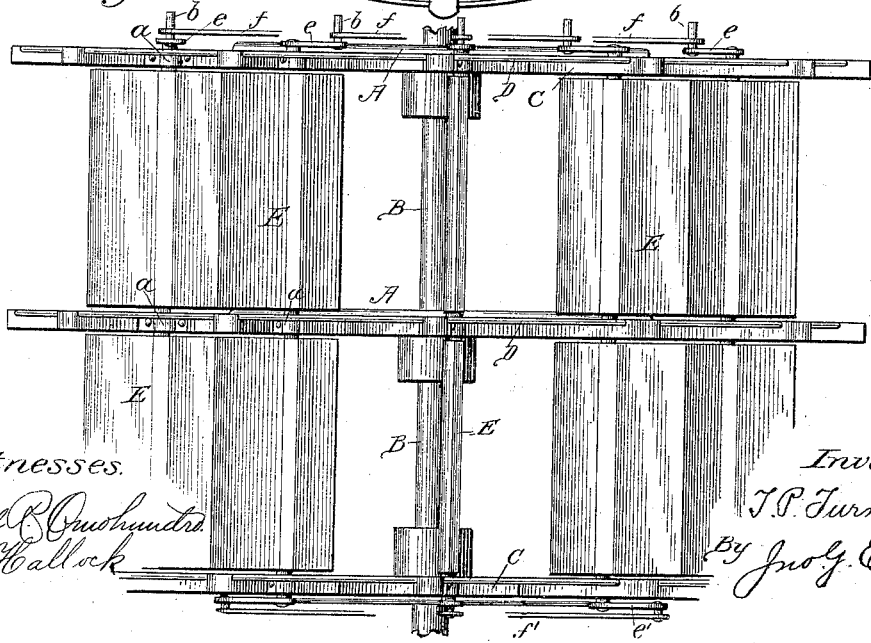

(No Model.) 4 Sheets—Sheet 3.
T. P. TURNBULL.
FEATHERING PADDLE WHEEL.
No. 335,726. Patented Feb. 9, 1886.
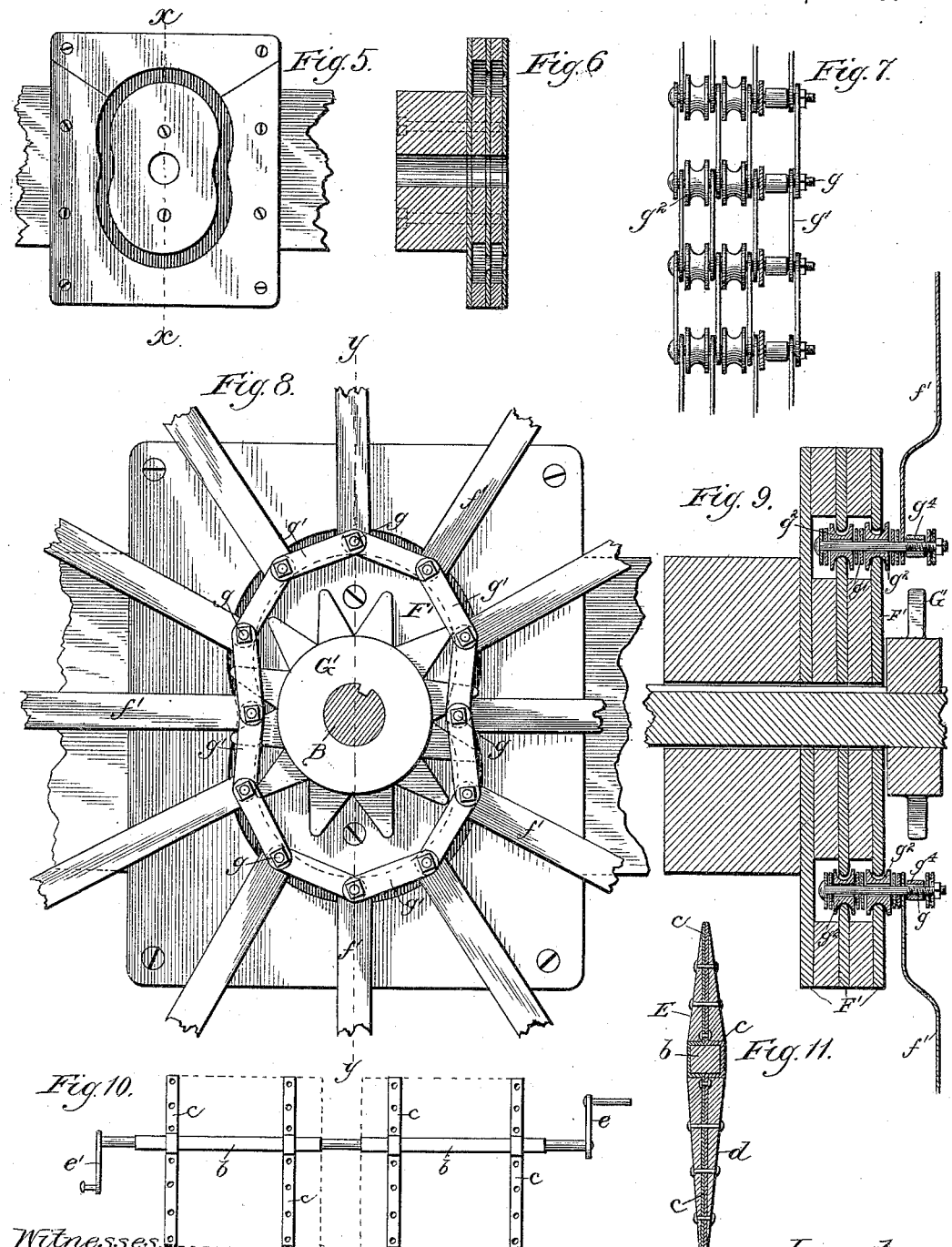

(No Model.) 4 Sheets—Sheet 4.
T. P. TURNBULL.
FEATHERING PADDLE WHEEL.
No. 335,726. Patented Feb. 9, 1886.
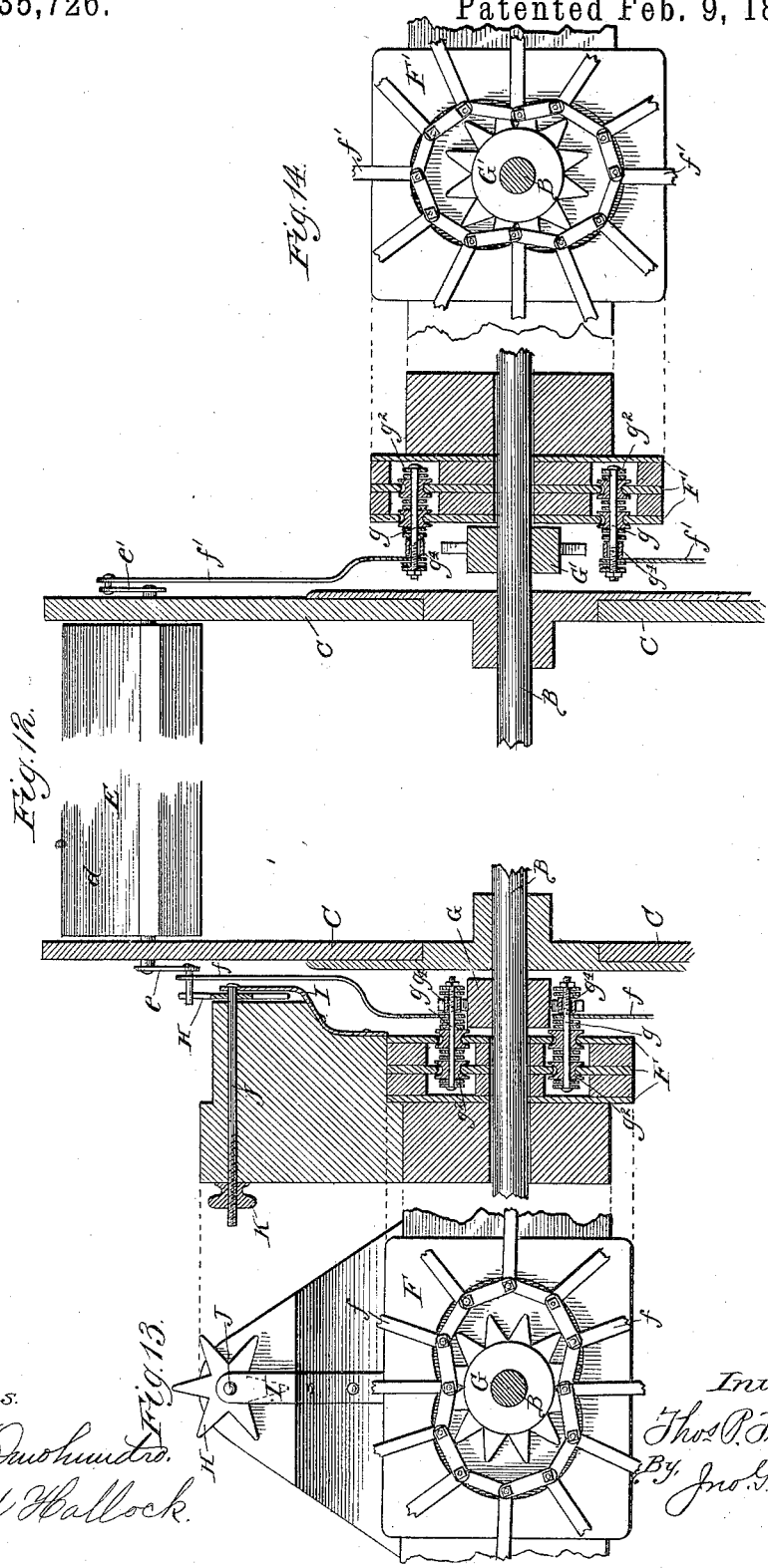
Witnesses:
Will R. Donohuntro.
Howard Hallock.
Inventor:
Thos. P. Turnbull
By Jno. G. Elliott
Atty.
N. PETERS, Photo-Lithographer, Washington, D. C.

UNITED STATES PATENT OFFICE.

THOMAS P. TURNBULL, OF ENGLEWOOD, ILLINOIS.

FEATHERING PADDLE-WHEEL.

SPECIFICATION forming part of Letters Patent No. 335,726, dated February 9, 1886.

Application filed May 5, 1885. Serial No. 164,505. (No model.)

*To all whom it may concern:*

Be it known that I, THOMAS P. TURNBULL, a citizen of the United States, residing in Englewood, in the county of Cook and State of Illinois, have invented certain new and useful Improvements in Paddle-Wheels, of which the following is a specification.

This invention relates to improvements in paddle-wheels in which the paddles have an axial movement independent of the axis of the wheel, in order to regulate and determine their direction of entrance and exit from the water, and in which an eccentric has heretofore been employed for actuating the paddles upon their axis.

Among the objections occurring in the prior construction of the character described are that the angles of entrance and exit of the paddles to the water are such that said paddles are subject while in the water to varying velocities and to the weight of the water to such a degree as to limit their effectiveness and subject them to strains tending to injure them; and, besides, their connections with the wheel and their actuating devices are such that their operation is at best uncertain and their construction not sufficiently durable to withstand the forces to which they are subject. Other and further objections are that the actuating devices of the paddles must be adjustable in order that they may operate at all practically when their depths in the water is increased or diminished.

The objects of this invention are to avoid these objections by such an arrangement and connection of the devices for actuating the paddles on their axis that said paddles will stand at all times while in the water with their faces vertical thereto, and hence not be subject, whether of greater or less depth in the water, to the force of backwater, and that two paddles respectively entering and leaving the water shall have the same velocities.

A further object of this invention is to provide for reversing the paddles upon their axis so that the same edge of said paddles will always enter the water in a line vertical thereto.

A further object of this invention is to utilize the force and weight of the water to maintain the paddles in a vertical position while in the water.

A still further object is to avoid any necessity of adjustment on the part of the mechanism actuating the paddles, and to have the lever-connections of the paddles flexibly connected and operated by a fixed irregular surface or cam, and in such a manner that the pivot connections or bearings of said levers will be relieved as nearly as possible from a lateral strain tending to bend said pivots, or cause such a wear in their bearings as to produce an uncertain or irregular stroke on the part of the levers, and hence the paddles; and, finally, to produce such a water-wheel of a maximum strength consistent with minimum simplicity and certainty of action by certain details of construction hereinafter described, and shown in the accompanying drawings, in which—

Figure 2:
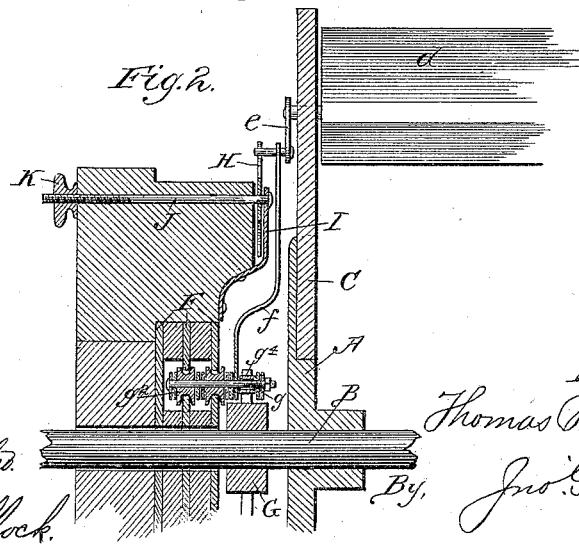

Figure 1 represents a side elevation of a water-wheel embodying my invention; Fig. 2, a detailed section through one of the camways; Fig. 3, a transverse vertical section through the wheel and shaft; Fig. 4, a plan view of the same; Fig. 5, a front elevation of one of the camways; Fig. 6, a section of the same on line $x$ $x$, Fig. 5; Fig. 7, a plan view of a portion of the chains or links connecting the rods actuating the paddles; Fig. 8, a front elevation of one of the camways, the links connecting the connecting-rods, and the sprocket for actuating said links; Fig. 9, a central section of the same on the line $y$ $y$, Fig. 8; Fig. 10, a detail elevation of the crank-shaft and arms upon which the paddles are mounted. Fig. 11, a transverse section through one of the paddles and its shaft; Fig. 12, a detail central longitudinal section taken through the wheel, its actuating-shaft, and the camways on each side thereof; Fig. 13, an elevation of the camway upon one side of the wheel annexed thereto; Fig. 14, a similar view of the cam upon the opposite side of the wheel.

Similar letters of reference indicate the same parts in the figures of the drawings.

The hub A of the wheel is rigidly secured upon the drive-shaft B, to be actuated in any well-known manner, and said hub is provided with the usual radial spokes, C, of which there are three sets, one at each side of and one in the center of width of the wheel, for supporting the paddles, which spokes are connected at their outer ends by a rod or hoop, D, passing through or secured to them in any suitable manner to brace and stiffen them. Toward the outer ends of these spokes, and journaled transversely thereon by means of suitable boxes, $a$, are a series of shafts, $b$, corresponding in number with the spokes and paddles to be employed, which may be of any number desirable or requisite for the special purpose intended. Rigid upon these shafts $b$ are a series of paddles, E, which, owing to the central spokes, are necessarily each composed of two parts, but when the central spokes are omitted may be in one piece, the shaft being squared, as shown in Fig. 11, to form a rigid bearing for the paddles effectually preventing their twisting, and the paddles being preferably composed of four sections bolted through and together upon a two-part metal plate, $c$, which embraces the shaft and adds strength and rigidity to the paddles as well as promoting their convenience of attachment or detachment when one or more of its parts have from any cause been injured. All of these paddles are so constructed and arranged relative to their respective shafts that one side, $d$, and the side which is intended shall first enter the water, is wider than the opposite side, in order that the force of the water shall serve to actuate the paddle on its axis to maintain it in a perpendicular position in the water, as hereinafter described.

Both ends of the shafts $b$ project beyond the sides of the wheel and terminate in reverse crank-arms $e\ e'$, (see Figs. 2 and 12,) to which are pivoted, respectively, connecting rods or bars $f f'$, which at their inner ends are pivoted on short shafts $g$, (see Figs. 2, 9, and 12,) which also constitute a pivotal connection for a continuous series of links or bars, $g'$. (See Fig. 7.) These continuous links or bars are four or more in number, and on each of the short shafts, and between these bars and sleeved on the pivots thereof, are a series of pulleys, $g^2$, two or more sets of which may be grooved for the purpose hereinafter described.

Upon some fixed portion of the frame and surrounding the drive-shaft of the wheel and at each end of the wheel are camways formed by one or more plates, F F', to the desired configuration, and presenting edges which embrace but permit the free movement between them of the groove-pulleys $g^2$, as clearly shown in Figs. 2, 9, and 12. Next these camways and rigid upon the shaft are sprocket-wheels G G', which engage anti-friction-rollers $g^4$ on the short shaft $g$, and by the rotation of the drive-shaft of the wheel actuate the chain-links, and with them the paddles, as hereinafter described.

The general form of the camways is such that the link-chain describes in its rotation therein a double eccentric movement, the axis of which eccentric is common to that of the axis of the drive-shaft of the wheel, and these camways on each side of the wheel are respectively arranged at a right angle to each other, as illustrated in Figs. 12, 13, and 14, in order that the strain upon the paddles may be equally distributed at all times, and particularly when in the water, along the entire length of their shaft, as will presently be seen.

From the above-described construction it will be observed that the axes of the paddles are always fixed relative to the axis of the wheel, and that the axes of the pivots at both extremities of the connecting-rods are constantly shifting, and therefore, as shown in Fig. 1, when the spoke of the wheel is in a horizontal position the paddle upon such spoke will be swung by the action of the camway and the pivotal connection to the connecting-rod to a vertical position. With the wheel traveling in the direction indicated by the arrows in Fig. 1 the paddle will be maintained in this vertical position during its descent, owing to the camway gradually forcing the connecting-rod inwardly until all of the centers of both the connecting-rod and paddle are on a dead-center, at which moment the connecting-rod is at the extremity of its stroke and the paddle its depth in the water. The moment these parts reach the vertical line and are on their dead-centers the opposing force of the water on the lower and wider portion of the blade tends to force said lower portion of the blade rearwardly, so as to break the dead-center and permit the connecting-rod to have an outward thrust, which, by reason of the formation of the camways, causes said rod to maintain the paddle in a vertical position until the spoke carrying the paddle has reached the horizontal line in the rear side of the wheel. As the paddle and its supporting-spoke continue to rise, the formation of the camway is such that the connecting-rod is gradually drawn inwardly until the spoke reaches a vertical position on the upper side of the wheel, at which moment the paddle and connecting-rod are again on a dead-center. Without some additional means for swinging the paddle upon its axis when it is on this upper dead-center the resistance of the air and the superior gravity of the wider portion of the paddle would cause its upper edge to swing backwardly, and as a result cause it to alternately present first its wide and then its narrow side, or vice versa, to the water, and correspondingly reduce its effectiveness of operation. This objection may, however, be overcome by a stop on some fixed portion of the support of the wheel, engaging the crank-arm of the paddle, so as to swing the wider portion of the paddle forward the moment these dead-centers occur. To this end I prefer and propose to employ (see Figs. 1 and 2) a spur-wheel, H, confined between a bracket, I, secured to the frame-work and rotating upon a rod, J. The bracket I is preferably composed of spring metal, and the rod projected through the sill of the frame and screw-threaded to receive a nut, K, by means of which the spur-wheel H may be clamped between the bracket and the side of the frame, and its resistance to the crank-arm be increased or diminished as desired.

In this connection it may be stated that any other means for increasing the tension or resistance of the stop engaging the crank-arm, or any other form of stop, may be employed without any material departure from the invention which a stop for engaging the crank-arm for the purpose described involves.

With this understanding of the operation of the paddles, it will now be seen, by reference to Figs. 12, 13, and 14, that when one or more of the paddles are in the water rearwardly in a vertical line to the axis of the main shaft the strain upon the connecting-rods upon the side of the wheel shown in Fig. 1 will be inwardly toward said axis, owing to the opposing pressure of water against the wider side of the blade, while (see Fig. 12) the strain upon the connecting-rods upon the opposite side of the wheel will be outwardly, owing to the reverse position of the crank-arms and the corresponding relative position of the connecting-rod relative to the paddle. The result of these opposing strains or resistance on the paddle is to distribute such strains along the entire length of its shaft and between the two connecting-rods and around the camway, and hence friction is not only decreased, but the force of strain avoided, which would otherwise tend to reach the wheel and the mechanism thereof and limit its durability to such an extent that it would not be thoroughly practical, for in all such wheels lightness as well as strength is an important consideration.

It may be here observed that it has been satisfactorily demonstrated by experiment that a wheel constructed in accordance with the invention described is not subject to any backwater whatever, and that therefore the paddles are used to a maximum degree in their propelling-powers. It may also be observed that like experiments have also shown conclusively that the operation and effect of the paddles are not at all changed, whether said paddles are submerged partly or wholly up to the drive-shaft of the wheel, or even slightly above the same, for even in this position when in the water the paddles are maintained in substantially a vertical line, and in such a line that they are not subject to a backwater-pressure, as are all paddle-wheels heretofore constructed.

Having described my invention, what I claim, and desire to secure by Letters Patent, is—

1. The pivoted paddles and the fixed camway or ways, in combination with rods connecting said paddles and camways, and a connection between the inner ends of said rods, substantially as described.

2. The wheel, the opposing camways forming a double eccentric having an axis common to both and the axis of the wheel, and arranged at a right angle to each other, in combination with the pivoted paddles and the rods connecting said paddles and camways, substantially as described.

3. The pivoted paddles, the camways, the link-chains having a double eccentric movement in said camways, in combination with rods pivoted to and constituting a connection between said paddles and chains, substantially as described.

4. The camways and the pivoted paddles, in combination with the connecting-rod, a shaft forming a bearing for said rod, and grooved pulleys working on said shaft and engaging the camways, substantially as described.

5. The camways, the link-chain moving therein, the pivoted paddles, the crank-arms thereof, and the connecting-rods, in combination with a stop upon a fixed portion of the wheel-frame, substantially as described.

6. The wheel-spokes, the paddles pivoted thereon, the fixed camways, the link-chains moving in said camways, the rod connecting said chains with the paddles, and an adjustable stop on some fixed portion of the frame, adapted to connect with and actuate the paddles upon their pivoted bearings, substantially as described.

7. The paddles, the pivoted shaft thereof provided with reverse crank-arms, the double-eccentric camways having a common axis and arranged at a right angle to each other, and the connection between said camways and the paddles, substantially as described.

8. The double-eccentric camways, the pivoted paddles, and the connecting-rods having a pivoted connection with the paddles and with the camways, said paddles having one side wider than the opposite side with reference to their pivot-bearings, whereby when said paddles are at the greatest depth in the water and on a dead-center the pressure of the water will tend to force the lower end of the paddle backward and off its dead-centers, substantially as described.

THOMAS P. TURNBULL.

Witnesses:
W. W. ELLIOTT,
JNO. G. ELLIOTT.